United States Statutory Invention Registration [19]

[11] Reg. Number: H227

Tracy et al. [43] Published: Mar. 3, 1987

[54] COLORED SMOKE-PRODUCING COMPOSITION

[75] Inventors: Gene V. Tracy, Bel Air; Joseph A. Domanico, Edgewood, both of Md.; Gerald P. Young, Newark, Del.

[73] Assignee: The United States of America as represented by the Secretary of the Army, Washington, D.C.

[21] Appl. No.: 903,630

[22] Filed: Aug. 29, 1986

[51] Int. Cl.[4] ..... C06B 29/10

[52] U.S. Cl. ..... 149/84

*Primary Examiner*—John F. Terapane
*Assistant Examiner*—Eric Jorgensen
*Attorney, Agent, or Firm*—Anthony T. Lane; Harold H. Card, Jr.; Edward F. Costigan

[57] ABSTRACT

This invention relates to a smoke-producing composition containing a dye and 1,4,- benzenedicarboxylic acid. The acid is useful for purging slag and solid clinker while lowering the steady state burning temperature of the composition. The coloring agent used by the composition does not degrade. The acid is an efficient coolant for the composition and takes advantage of sublimation reactions to produce the properties enumerated here.

7 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COLORED SMOKE-PRODUCING COMPOSITION

GOVERNMENTAL INTEREST

The invention described herein may be manufactured, used and licensed by or for the Government for Governmental purposes without payment to me of any royalties thereon.

This invention relates to an improved smoke-producing composition containing a dye and 1, 4-benzenedicarboxylic acid.

BACKGROUND

In the past, colored smoke formulations have employed the use of mixtures containing a fuel, an oxidizer, and a dye. The principle behind the use of such formulations lies in the reaction between the fuel and oxidizer, and the accompanying release of a large amount of energy during such reaction. The latter exothermic reaction releases the energy contained in the bonds of the highly structured fuel molecule as heat. This causes the dye component of the formulation to undergo phase transitions from a solid to a liquid and ultimately to a vapor. If the temperature of the reaction is too high degradation of the dye will result.

Generally, the dye exists as a solid crystal at standard temperature and pressure. When heat from the cited reaction is applied to the solid crystal, dislocations of the molecule occur in the crystalline lattice. As molecules of the dye become detached from the central lattice, a liquid is formed. As more heat energy is applied, the individual molecules of the dye begin to move faster and faster. The molecules, as a result, translate through space, rotating about the axes of the dye structure, and vibrate in many complex modes. The latter molecular activity is responsible for the transition of the liquid phase to the vapor phase.

It is to be noted that the individual molecules of the dyes are subject to degradation at elevated temperatures. If the molecular structure of the dyes are subject to forces and energies which, if great enough, cause cleavage of the bonds of the molecule, changes in color occur or loss of color properties are likely. Therefore, a dye material is sought which transforms from the solid to the vapor phase with little or no intermediate liquid phase. This enhances the likelihood of the dye escaping in the vapor phase to the atmosphere from the solid matrix made of fuel, oxidizer, and dye. Thus, dyes are sought for the composition which have the property of sublimation at increased temperatures and normal pressures.

Another problem in the art is the production of a solid residue as the smoke-producing composition burns. This contributes to the formation of waste products such as slag and solid clinkers. When such solid materials accumulate in the core of the munition, they prevent the generated gases from escaping. As a result, deflagration can occur which can cause injury, or result in a limited release of colored smoke. Further, the formation of slag increases the decomposition of the dye vapor and may lead to a deterioration of color. It has been found that only a small number of dye materials are suitable for use in the formulations of the art because of the slag or clinker presence.

What is needed in the art is a component of the formulation which will absorb excess energy of the thermally decomposing fuel. Also, what is needed is a compound having a high vapor pressure which will aid in purging the core of excess slag and solid clinkers.

SUMMARY OF INVENTION

It is an object of this invention to provide an improved composition for use in producing colored smoke.

Another object is to provide a smoke-producing composition containing a dye whose function is enhanced by 1,4-benzenedicarboxylic acid.

A further object is to provide an improved composition for use providing colored smoke in which the coloring agent does not degrade.

A still further object is to provide an improved smoke producing composition containing 1,4-benzenedicarboxylic acid for use in purging slag and solid clinker.

Still another object is to provide an improved smoke-producing composition containing 1,4-benzenedicarboxylic acid which functions to lower the steady state burning temperature of the composition.

Other and further objects will become more apparent from a reading of the following detail description.

It has been found that 1,4-benzenedicarboxylic acid is an excellent additive for use in a smoke-producing composition containing a degradable dye. The cited additive has been found to be a very efficient coolant because it sublimes at the reaction temperature encountered in pyrotechnic colored smoke formulations. Due to the fact that the sublimation process is an endothermic process, a large quantity of energy is consumed. The sublimation process also produces a large quantity of vapor (approximately 135 cc/g) at standard temperature and presure, and this aids in sweeping the evaporated dye out of the munition. It also aids to prevent the build-up of slag. The reduction of slag enhances the production of color because, in the ordinary case, passing through the hot slag of conventional pyrotechnic mixes has a deleterious effect on the vaporized dye.

In general, the ingredients of the composition may be within the ranges indicated in Table 1.

TABLE 1

Improved Pyrotechnic Composition

| Material | Percent by Weight |
|---|---|
| 1,4-benzenedicarboxylic acid | 7 to 35 |
| Solvent Red Dye | 30 to 50 |
| Sugar (Fuel) | 13 to 25 |
| Potassium chlorate | 17 to 30 |
| Sodium bicarbonate or magnesium carbonate | 5 to 20 |

More specifically, excellent results are obtained with the formulation set forth in the following examples.

Preferred Pyrotechnic Compositions

| Material | Percent by Weight |
|---|---|
| Example 1 | |
| 1,4-benzenedicarboxylic acid | 30 |
| (Solvent Red 1) | 35 |
| Sucrose | 13 |
| Potassium chlorate | 17 |
| Sodium bicarbonate | 5 |
| Example 2 | |
| Solvent Red 1 | 34.5 |
| Disperse Red 11 | 6.0 |
| $KClO_3$ | 23.0 |
| 1,4-Benzenedicarboxylic Acid | 12.0 |
| $MgCO_3$ | 12.5 |
| Example 3 | |

-continued

| Preferred Pyrotechnic Compositions | |
|---|---|
| Material | Percent by Weight |
| Solvent Red 1 | 34.2 |
| Disperse Red 11 | 6.8 |
| $KClO_3$ | 16.5 |
| Sucrose | 17.5 |
| 1,4-Benzenedicarboxylic Acid | 14.5 |
| $MgCO_3$ | 10.5 |
| Example 4 | |
| Solvent Yellow 33 | 35.0 |
| $KClO_3$ | 20.0 |
| Sucrose | 15.0 |
| 1,4-Benzenedicarboxylic Acid | 30.0 |
| Example 5 | |
| Solvent Yellow 33 | 38.0 |
| $KClO_3$ | 18.0 |
| Sucrose | 14.0 |
| 1,4-Benzenedicarboxylic Acid | 30.0 |
| Example 6 | |
| Solvent Red 24 | 31.0 |
| $KClO_3$ | 18.0 |
| Sucrose | 14.0 |
| 1,4-Benzenedicarboxylic Acid | 31.5 |
| $NaHCO_3$ | 5.5 |

It should be noted that the above range of proportions indicated in Table 1 are critical. For instance, if the additive, i.e. 1,4-benzenedicarboxylic acid, is present in the composition in an amount below 7 percent by weight, the dye will be thermally degraded, and undesirable slag or clinkers will form in the core of the munition. If the cited additive is present in an amount above 35 percent by weight, the color of the smoke will be exceedingly diluted by the abundance of white, opaque smoke produced by the cited additive itself and will defeat the intended purpose of the composition which is to produce colored smoke. Further, if the dye is present in the composition in an amount below 30 percent by weight, the colored smoke produced by the composition will be exceedingly thin. However, if the dye compound is present in the composition in an amount above 50 percent by weight, it can ignite and the flame produced may not be extinguished. If the fuel is present in an amount below 13 percent by weight, the composition will not ignite or produce smoke. On the other hand, if the fuel is present in the composition at an amount above 25 percent by weight, the reaction of the composition will tend to proceed at a high temperature, and the dye will be thermally degraded. If the cited oxidizer is present in the composition in an amount below 17 percent by weight, the composition will not ignite. However, an oxidizer amount in the composition of over 30 percent by weight may lead to an explosion and the dye will be set on fire and will thermally degrade at the high temperature produced. If the coolant, $NaHCO_3$ or $MgCO_3$ is present below about 5 percent by weight, there will be an accumulation of acid which will cause the reaction rate of the composition to be undesirably accelerated leading to a thermal degradation of the dye. If this coolant is present in the composition in an amount above 20 percent by weight the composition will not ignite at all.

It should also be noted that of the dyes in use, thermal decomposition limits their usefulness more than any other factor. It has been found that the addition of 1,4-benzenedicarboxylic acid permits the use of dyes that would not be feasible because of excess thermal decomposition. Further, the sublimed 1,4-benezenedicarboxylic acid condenses into a dense white smoke once it is outside the reaction zone. The latter smoke has demonstrated a high opacity to light in the visual region of the spectrum. Thus, the addition of this dense, white smoke increases the opacity of the smoke produced by the formulation. Also, the conventional coolant, $NaHCO_3$, does not contribute to the actual quantity of smoke produced by the formulation. If a portion of the sodium bicarbonate is replaced by 1,4-benzenedicarboxylic acid, the efficiency of the reaction of the fuel and oxidizer is increased because additional smoke is produced while the 1,4 additive also serves as a coolant. In actual use, the 1,4-benzenedicarboxylic acid is substituted in the formulation for a portion of both the dye and sodium bicarbonate.

The dyes which may be used in this invention included the anthraquinone dyes and the phenylazo-betanaphthol dyes. The anthraquinone dyes have an anthracene-dione structure with a molecular weight between 208 to 390 grams per mole. The azo dyes are compounds containing a trifluoromethyl-2-aminobenzothiazole diazo component and an aniline, benzomorpholine or 1, 2, 3, 4-tetrahydroquinoline component. The dyes which are appropriate include conventional disperse dyes used on polyester, polyamide, acrylic, triacetate and other synthetic fabrics. Those which may be used include dyes which may be used for transfer printing on polyesters and polyamide.

The dyes which may be used in this invention are listed by the Society of Dyers and Colorists in a classification of dye materials according to chemical structure and include the following, viz.

C. I. Mordant Blue 24, C. I. 60880 1,5,8-trihydroxy-2-amino-(9,10)anthracenedione C. I. Disperse Red 15, C. I. 60710 1-amino-4-hydroxy-(9,10)anthracenedione C. I. Mordant Red, 11, C. I. 58000 1,2-dihydroxy-(9,10)anthracenedione C. I. Disperse Red 11, C. I. 62015 1,4-diamino-2-methoxy-9,10)anthracenedione C. I. Disperse Red, 9, C. I. 60505 1-methylamino-(9,10)anthracenedione C. I. Solvent Red 1, C. I. 12150 ortho methoxy phenyl-azo-betanapthol C. I. Solvent Yellow 33, C. I. 47000 2-(2-quinolyl)-1,3 indandione C. I. Solvent Red 24, C. I. 26105 ortho methyl phenyl azo-ortho methyl-azo-betanapthol C. I. Disperse Red 60, C. I. 60756 1,4-diamino-2-phenoxy-(9,10)anthracenedione The oxidizer which may be used in this invention is potassium chlorate.

The fuels which are included in the composition of this invention are as follows, viz.

sucrose,
fructose,
lactose,
maltose,
corn starch,
dextrin,
wheat flour,
cellulose, and
sulfur.

Processing

The ingredients of the improved composition in the proportions listed in Table II are individually weighed and added to a mixing bowl. The mixer utilized is a Hobart planetary gearstyle mixer. A measured volume of acetone solvent (0.40 liters) is introduced into the mixing bowl per kilogram of dry mix. Initially, the mix appears as a very viscous wet slurry of the components. As mixing proceeds, the acetone evaporates and the composition has the consistency of a wet dough. Mixing is continued and as more acetone evaporates, the doughy composition breaks into chunks which then form smaller pellets as mixing continues. Mixing is further continued until all visible acetone has evaporated and relatively dry, well mixed spherical pellets of agglomerated mix are produced. The entire mixing process can be accomplished in approximately 25 minutes for each kilogram of finished mixture when a 5 quart mixing bowl is used.

The pellets are poured from the mixing bowl into drying trays. The mix is spread on the drying trays so that the mix is flat and at a uniform level in the tray. The trays are placed in an oven maintained at 140° F. to evaporate any residual acetone.

It should also be noted that the cited ingredients can be blended together as dry powders using standard pyrotechnic techniques. The wet mixing technique described above is however the best of the methods normally employed.

Loading

After drying, the pellets are hydraulically loaded into grenade bodies. The load applied to the surface of the mix in the grenade body is about 5000 to 6000 l pounds. Starter mixture is applied to the grenades, and tops are sealed onto the body.

The color smokes produced by the composition of this invention were compared to smoke produced by similar formulations without 1,4-benzene dicarboxylic acid. This was accomplished by making the various pyrotechnic mixtures and forming them into grenades in the manner heretofore indicated. The grenades were then burned in a side by side visual comparison. The subjective evaluation of the color quality of the smoke produced was a reliable indication of the improved effectiveness and efficiency of the 1,4-benzenedicarboxylic acid additive.

Another indication of the greater smoke munition efficiency is the length of flaming time recorded during the burn. It was found that flaming was reduced with the compositions of this invention in comparison to the more frequent experience of flaming with the standard mixtures which only contained standard amounts of sodium bicarbonate in the mixtures. The improved effectiveness and efficiency of the composition of this invention was shown throughout the comparison.

What is claimed:

1. An improved smoke-producing pyrotechnic composition consisting essentially of:

| Material | Percent by Weight |
|---|---|
| 1,4-benzenedicarboxylic acid | Between about 7 and 35 |
| Solvent Red Dye | Between about 30 and 50 |
| Fuel | Between about 13 and 25 |
| Potassium chlorate | Between about 17 and 30 |
| Sodium bicarbonate or | Between about 5 and 20. |

-continued

| Material | Percent by Weight |
|---|---|
| magnesium carbonate | |

2. The composition of claim 1 containing:

| Material | Percent by Weight |
|---|---|
| 1,4-benzenedicarboxylic acid | About 30 |
| (Solvent Red 1) | About 35 |
| Sucrose | About 13 |
| Potssium chlorate | About 17 |
| Sodium bicarbonate | About 5. |

3. The composition of claim 1 containing:

| Material | Percent by Weight |
|---|---|
| Solvent Red 1 | About 34.2 |
| Disperse Red 11 | About 6.8 |
| $KClO_3$ | About 16.5 |
| Sucrose | About 17.5 |
| 1,4-Benzenedicarboxylic Acid | About 14.5 |
| $MgCO_3$ | About 10.5. |

4. The composition of claim 1 containing:

| Material | Percent by Weight |
|---|---|
| Solvent Red 24 | About 31.0 |
| $KClO_3$ | About 18.0 |
| Sucrose | About 14.0 |
| 1,4-Benzenedicarboxylic Acid | About 31.5 |
| $NaHCO_3$ | About 5.5. |

5. An improved smoke-producing composition consisting essentially of:

| Material | Percent by Weight |
|---|---|
| Solvent Yellow 33 | About 38.0 |
| $KClO_3$ | About 18.0 |
| Sucrose | About 14.0 |
| 1,4-Benzenedicarboxylic Acid | About 30.0. |

6. An improved smoke-producing composition consisting essentially of:

| Material | Percent by Weight |
|---|---|
| Solvent Yellow 33 | About 35.0 |
| $KClO_3$ | About 20.0 |
| Sucrose | About 15.0 |
| 1,4-Benzenedicarboxylic Acid | About 30.0. |

7. An improved smoke-producing composition consisting essentially of:

| Material | Percent by Weight |
|---|---|
| Solvent Red 1 | About 34.5 |
| Disperse Red 11 | About 6.0 |
| $KClO_3$ | About 23.0 |
| 1,4-Benzenedicarboxylic Acid | About 12.0 |
| $MgCO_3$ | About 12.5. |

* * * * *